(12) United States Patent
Volpi et al.

(10) Patent No.: US 10,475,416 B2
(45) Date of Patent: Nov. 12, 2019

(54) DISPLAYING IMAGE DATA BASED ON LEVEL OF SYSTEM PERFORMANCE

(71) Applicant: DISPLAYLINK (UK) LIMITED, Cambridge (GB)

(72) Inventors: Carlo Volpi, Cambridge (GB); Tadeusz Marquardt, Katowice (PL)

(73) Assignee: DISPLAYLINK (UK) LIMITED, Cambridge (GB)

(*) Notice: Subject to any disclaimer, the term of this patent is extended or adjusted under 35 U.S.C. 154(b) by 0 days.

(21) Appl. No.: 15/821,685

(22) Filed: Nov. 22, 2017

(65) Prior Publication Data

US 2018/0151150 A1 May 31, 2018

(30) Foreign Application Priority Data

Nov. 28, 2016 (GB) .................. 1620093.3

(51) Int. Cl.

| | |
|---|---|
| *G09G 5/00* | (2006.01) |
| *G06F 8/38* | (2018.01) |
| *G06F 9/451* | (2018.01) |
| *G09G 5/08* | (2006.01) |
| *G09G 5/377* | (2006.01) |
| *G06F 3/14* | (2006.01) |
| *G06F 9/4401* | (2018.01) |

(52) U.S. Cl.
CPC ........... *G09G 5/005* (2013.01); *G06F 3/1454* (2013.01); *G06F 8/38* (2013.01); *G06F 9/452* (2018.02); *G09G 5/006* (2013.01); *G09G 5/08* (2013.01); *G09G 5/377* (2013.01); *G06F 9/4411* (2013.01); *G09G 2340/10* (2013.01); *G09G 2350/00* (2013.01); *G09G 2354/00* (2013.01); *G09G 2360/18* (2013.01); *G09G 2370/02* (2013.01); *G09G 2370/22* (2013.01)

(58) Field of Classification Search
None
See application file for complete search history.

(56) References Cited

U.S. PATENT DOCUMENTS

| | | |
|---|---|---|
| 2006/0053233 A1 | 3/2006 | Lin et al. |
| 2007/0079244 A1 | 4/2007 | Brugiolo |
| 2007/0288584 A1 | 12/2007 | Tsai et al. |
| 2012/0011193 A1 | 1/2012 | Gilboa |
| 2016/0330260 A1 | 11/2016 | Ruge |

FOREIGN PATENT DOCUMENTS

| | | |
|---|---|---|
| EP | 2237482 | 10/2010 |

*Primary Examiner* — Yingchun He
(74) *Attorney, Agent, or Firm* — Haynes and Boone, LLP (57) ABSTRACT

A method to composite image data into an image frame and transmit the image frame to a controller for display on a device. The image has a predetermined portion having a QoS requirement higher than the rest of the image. Based on a performance level of the system, the predetermined portion with the image data is composited into the image frame at the host device if the host device has sufficient performance capability. If the performance level is not sufficient, then the host device composites the image data without the predetermined portion and transmits it to the controller. The host device also transmits information regarding the predetermined portion to the controller independently of the image frame, so that the controller can composite the received image frame with the predetermined portion based on the information to produce the image for display.

20 Claims, 6 Drawing Sheets

DISPLAYING IMAGE DATA BASED ON LEVEL OF SYSTEM PERFORMANCE

CROSS-REFERENCE TO RELATED APPLICATION

This application is based on and claims priority to Great Britain Patent Application No. 1620093.3 entitled "Displaying Image Data Based on Level of System Performance", which was filed on Nov. 28, 2016, which is hereby incorporated by reference in its entirety.

BACKGROUND

In many situations it is desirable to compress image or video data that is to be displayed on a monitor, television screen or even a projector because communication channels either have low bandwidth or are being shared for many different communication sessions so that each one has a limited bandwidth, for example over a network.

A known method of connecting a display device to a computer is to connect the display device to a USB socket on the computer, as all modern computers are provided with multiple USB sockets. This provides a simple connection topology, but requires additional hardware and software to be present since it is necessary to compress display data due to the relatively-low bandwidth of a USB connection. However, compression and the associated processing add a delay to the transmission of display data to the display device.

There may be specific portions of an image that have a higher quality-of-service requirement than other portions of an image even within the same displayed image. For example, some portions may be time-critical and need to be updated more regularly and/or reliably as the user will notice if they are delayed. For example, a clock must be updated every second exactly on time, whereas a warning indication must appear immediately and reliably so.

A common example of such a portion of an image is a cursor, which, in a conventional computer arrangement, is likely to be the user's main point of interaction with the computer. When the user moves a mouse, he or she expects to see an immediate reaction from the cursor and it is undesirable for the user to see a delay in the movement of the cursor, even if there is a delay in displaying movement or updating the rest of the image, since the user is usually focussing on the cursor at this time.

Conventionally, there are two methods by which a cursor icon is rendered to a display device: the so-called "hardware" and "software" methods.

The "hardware" method requires the cursor icon to be stored and transmitted separately to the main display data. This means that the cursor can be displayed more quickly, but can lead to poor synchronisation between the cursor and the main display data. The most noticeable example of this is window lag, in which a user is using the mouse to drag a window, and the cursor moves ahead of the window. This leads to a poor user experience.

The "software" method involves rendering the cursor icon as part of the main display data. This means that the cursor icon will always be moved and updated at the same rate as the main display data, but if there is lag in the rendering and transmission of the main display data there will be a delay in the movement of the cursor, which is likely to frustrate the user when the mouse is his or her main method of interaction with a computing device.

Since the cursor is the most common example of a time-critical user interface element, it is the only one which has any form of acceleration such as the "hardware" method. Other similar user interface elements must be transmitted as part of the main display data, with associated delays.

The invention seeks to mitigate at least some of these problems.

SUMMARY

Accordingly, the invention provides, in a first aspect, a method for displaying an image on a display device, the display device being part of a display system also comprising a host device configured to at least composite image data into an image frame and to transmit the image frame, and a display controller configured to receive the image frame over a data communication channel from the host device, wherein the image displayed on the display device comprises a predetermined portion having a Quality of Service (QoS) requirement higher than the rest of the image, the method comprising: measuring a performance level of the display system; determining whether the performance level is above a predetermined threshold; if it is determined that the performance level is above the predetermined threshold, then: compositing the predetermined portion with the image data into the image frame at the host device; and transmitting the image frame including the predetermined portion from the host device to the display controller over the data communication channel for display on the display device as the image; if it is not determined that the performance level is above the predetermined threshold, then: compositing the image data without the predetermined portion into the image frame at the host device; transmitting the image frame without the predetermined portion from the host device to the display controller over the data communication channel; transmitting information regarding the predetermined portion from the host device to the display controller over the data communication channel independently of the image frame; and compositing the received image frame with the predetermined portion at the display controller based on the information to produce the image for display on the display device.

Preferably, the information is transmitted at least as often as the image frame is transmitted, and most likely, more often.

In one embodiment, the information comprises image data for the predetermined portion and location information indicating where the image data for the predetermined portion is to be composited with the image frame. In an alternative embodiment, the image data for the predetermined portion is generated at the display controller and the information comprises location information indicating where the image data for the predetermined portion is to be composited with the image frame.

Preferably, the information regarding the predetermined portion is transmitted with higher priority or QoS than the image data.

The predetermined portion may be determined by heuristically determining a portion of the image that has a higher QoS requirement than the rest of the image. For example, the portion of the image that has a higher QoS requirement than the rest of the image comprises determining which portion of the image a user is looking at.

In some embodiments, the performance level comprises one or more of: processing power available at the host device; bandwidth available on the data communication channel; and lack of latency in the display system.

The lack of latency may be between a time when the image data is generated or received by the host device and a time when the image is displayed by the display device.

In some embodiments, the quality of service requirement comprises one or more of: time-criticality of information in the predetermined portion; update frequency of the predetermined portion; dependability of display of information in the predetermined portion on the display device; and priority of information in the predetermined portion.

The predetermined portion may comprise one or more of: a cursor; a moving icon that indicates that the system is executing; a clock; a warning or alarm indication.

According to a second aspect, the invention provides a display system configured to perform the method described above, and, in another aspect, provides a computer readable medium including executable instructions which, when executed in a processing system, cause the processing system to perform the method described above.

Therefore, in a particular aspect, the invention provides a method for dynamically switching between cursors provided by the "hardware" and "software" methods, comprising: determining a performance level; if the performance level exceeds a predetermined threshold, using a cursor provided by the "software" method; otherwise, using a cursor provided by the "hardware" method; and switching from one cursor type to the other as appropriate.

The performance level may be determined periodically or in response to a stimulus such as the connection of a new display device or an alteration in the applications running on the host device.

The performance level may refer, for example, to the bandwidth of an internal or external connection, processing power available on the host device, or latency between the generation of display data and its display.

Switching between the cursors provided by the "hardware" and "software" methods may comprise: a processor on the computing device transmitting a signal to an output engine on the host device indicating that it should stop adding a cursor to each received frame; if appropriate, the output engine forwarding the signal to the display device; the processor adding the cursor icon to the next frame to be transmitted; and the "software" method to provide the cursor being used until further notice.

Switching between the cursors provided by the "software" and "hardware" methods may comprise: a processor on the computing device transmitting a signal to an output engine on the host device indicating that it should use the "hardware" method to provide the cursor; if appropriate, the output engine forwarding the signal to the display device; the processor no longer adding the cursor icon to frames it generates; the processor transmitting the location of the cursor to the output engine; the output engine either adding the cursor to the next frame to be displayed, or transmitting the location of the cursor to the display device, which adds a cursor to the next frame to be displayed; and the "hardware" method to provide the cursor being used until further notice.

The output engine may be a hardware engine, or may be a piece of software such as a device driver. Furthermore, the cursor provided by the "hardware" method may be added either by a module co-located with the display device—i.e. within the same casing—or by a separate display controller within, for example, a docking station.

This method allows both cursor types to be used, depending on the requirements of the system. When performance is limited, for example when the connection between the host device and the display device has a limited bandwidth, or the display device has a large resolution and therefore large frames must be generated, frame updates may be delayed, leading to lag between user interaction with the mouse and visible changes in the position of the cursor. Under these circumstances, the cursor provided by the "hardware" method can be used. This results in low latency between movements of the mouse and the corresponding movements of the cursor, which makes the system appear more responsive to the user.

However, because use of the cursor provided by the "hardware" method may lead to lack of co-ordination between the cursor and other display data, and furthermore there may be performance penalties if the operating system of the host device attempts to transmit display, data while the location of the cursor is being updated, it is beneficial to be able to switch back to the cursor provided by the "software" method when performance is good enough.

The method of the invention therefore gives a better user experience even under a variety of connection circumstances and computing capability levels.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
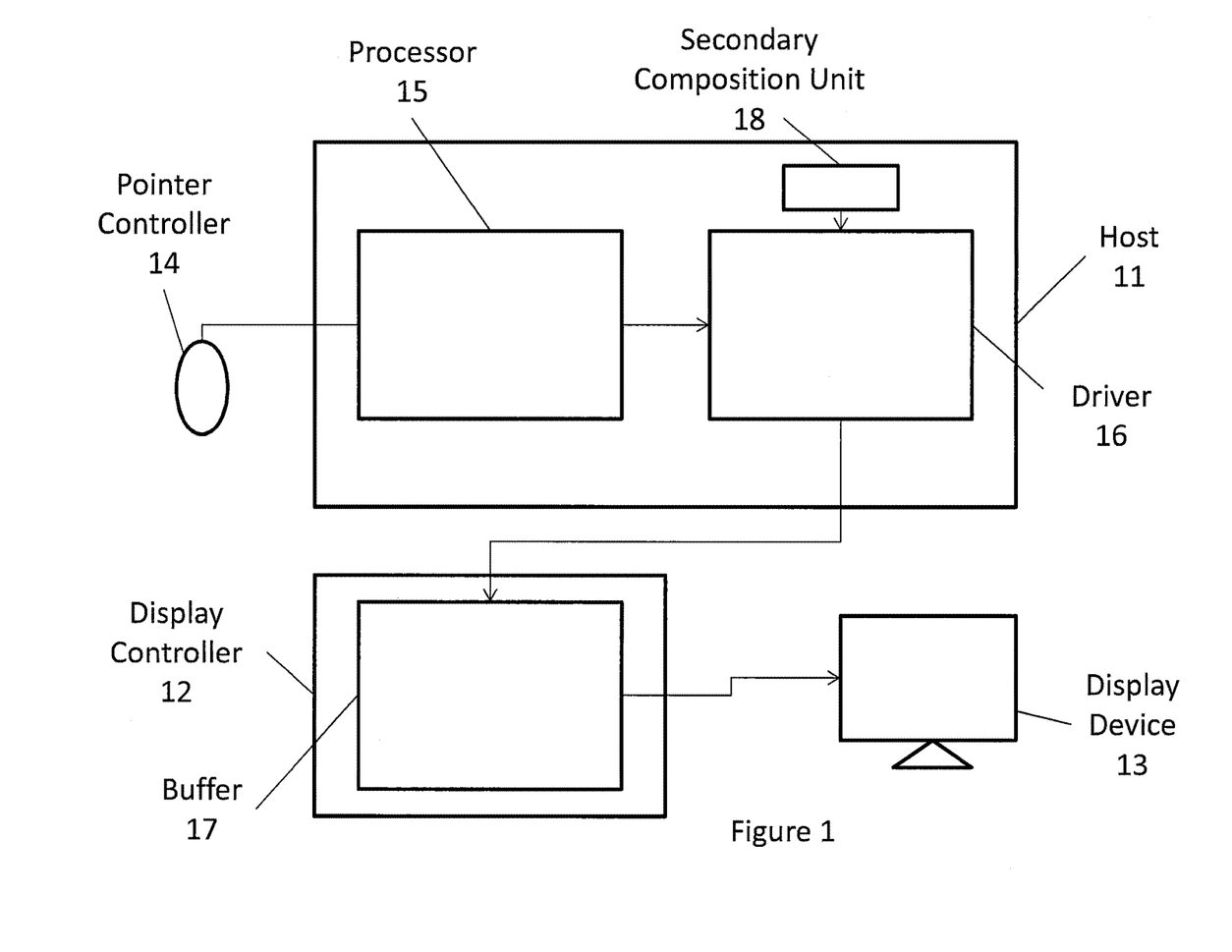
FIG. 1 shows a block diagram of a system arranged according to a first embodiment of the invention with secondary composition.

FIG. 1 shows a display system comprising a host computing device [11] ("host") connected to a display controller [12], which is in turn connected to a display device [13]. The host [11] includes a processor [15] running an operating system, which acts as a windowing system. The operating system uses the processor to generate image data and composite frames, and as such has a dedicated frame buffer, which is stored in memory. When a predetermined portion of image data—in this example a cursor—is composited with the other image data into the image frame according to the "software" method, this is carried out here. There is also a driver [16] running on the host [11], which controls the display controller [12] and is responsible for transmitting data to it. It may also have its own frame buffer, and is capable of performing blending, compression, and encryption operations on the display data as appropriate prior to transmission.

The display controller [12] incorporates a frame buffer [17] which stores received display data prior to transmission to the display device [13] for display. It may be a full frame buffer, or it may be a flow buffer.

The host [11] also incorporates a secondary composition unit [18], which will contain an appropriate image to represent the cursor, conventionally a small arrow but other images can be used. The secondary composition unit [18] may consist only of this buffer, or it may be a processing engine or module in its own right, which is capable of fetching and blending the cursor under the instruction of the driver [16]. For clarity, functions carried out by a secondary composition unit [18] which is a processing engine or module will be treated herein as being carried out by the driver [16].

Finally, there is a pointer controller [14] connected to the host [11], which in this embodiment passes input directly to the processor [15]. There may be other drivers and controllers associated with the pointer controller [14], but these are not shown here. The pointer controller [14] may be any user interface device that allows the user to interact with the host [11] via a pointer mechanism, such as a mouse, joystick, touchscreen, trackpad, eye-tracking device, or the like. However, the most common pointer controller currently in use is a mouse and this is the example that will be used in this description.

The host [11] may be connected to the display controller [12] and/or the display controller [12] to the display device [13] by any data communication channel, whether wired or wireless, or over a network, including the interne. Furthermore, the three devices [11, 12, 13], or any two of them, may be co-located, i.e. contained within a single casing so that they appear to be a single device.

Figure 2:
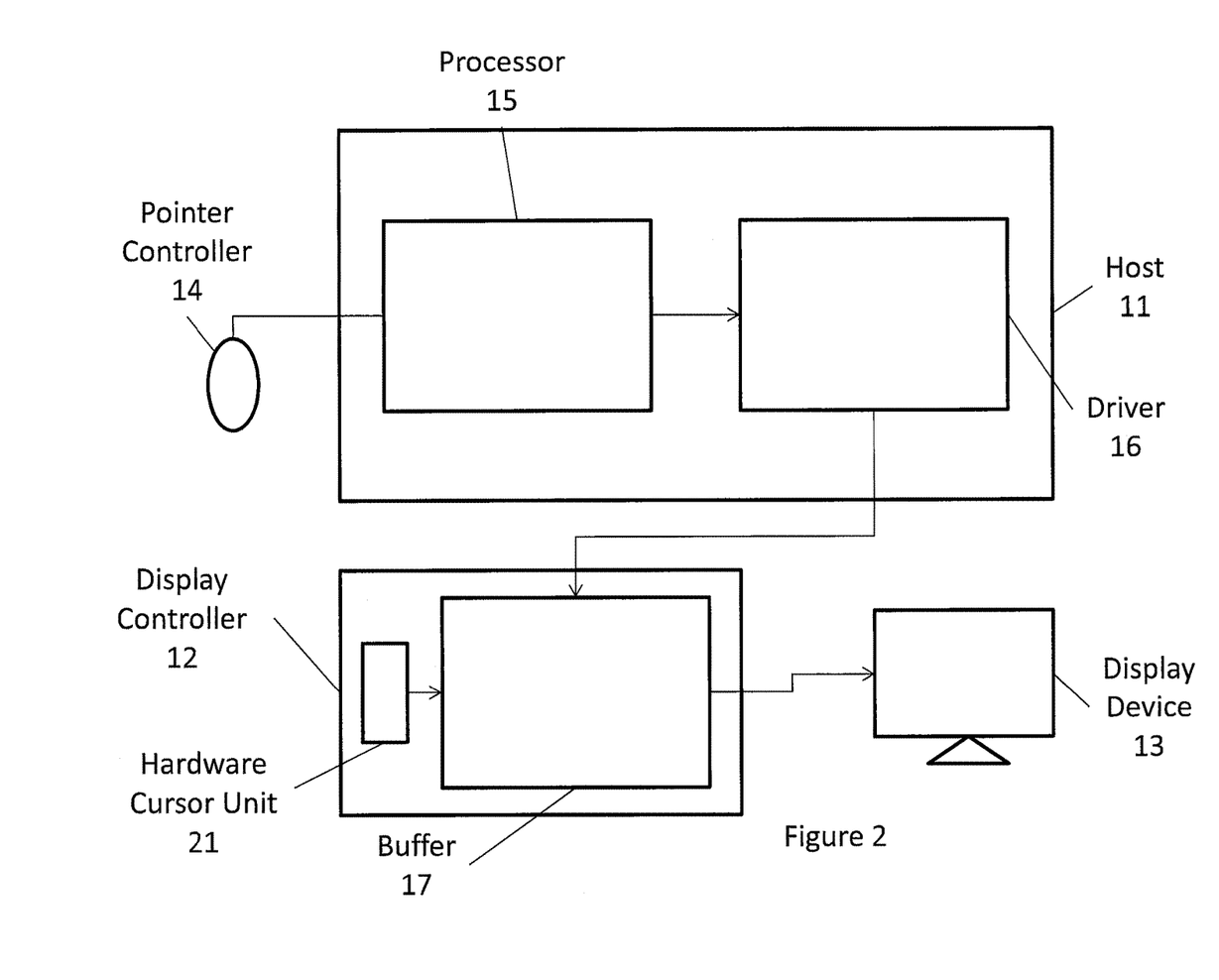
FIG. 2 shows a block diagram of a system arranged according to a second embodiment of the invention with a cursor provided by the "hardware" method.

FIG. 2 shows a similar system, also comprising a host [11], display controller [12], and display device [13], connected to one another. As described in FIG. 1, the host [11] incorporates a processor [16] running a windowing system such as an operating system, with its own frame buffer. The host [11] also incorporates a driver [16], which may also have its own frame buffer to hold display data prior to transmission to the display controller [12].

The display controller [12] not only incorporates a frame buffer [17] as previously described, but also a hardware cursor unit [21]. As previously described for the secondary composition unit [18] in FIG. 1, this contains the appropriate image to represent the cursor and may be a processing engine or module in its own right or simply a buffer which is used by another processor within the display controller [12]. For the purposes of this description, the composition of a predetermined portion with a received image frame will be treated as being carried out by a hardware cursor unit [21] which is an independent processing module or engine.

As in FIG. 1, the host [11] is connected to a mouse [14], which allows the user to interact with the host [11] by providing the location of a pointer, and therefore the cursor, as well as other control data.

Figure 3A:
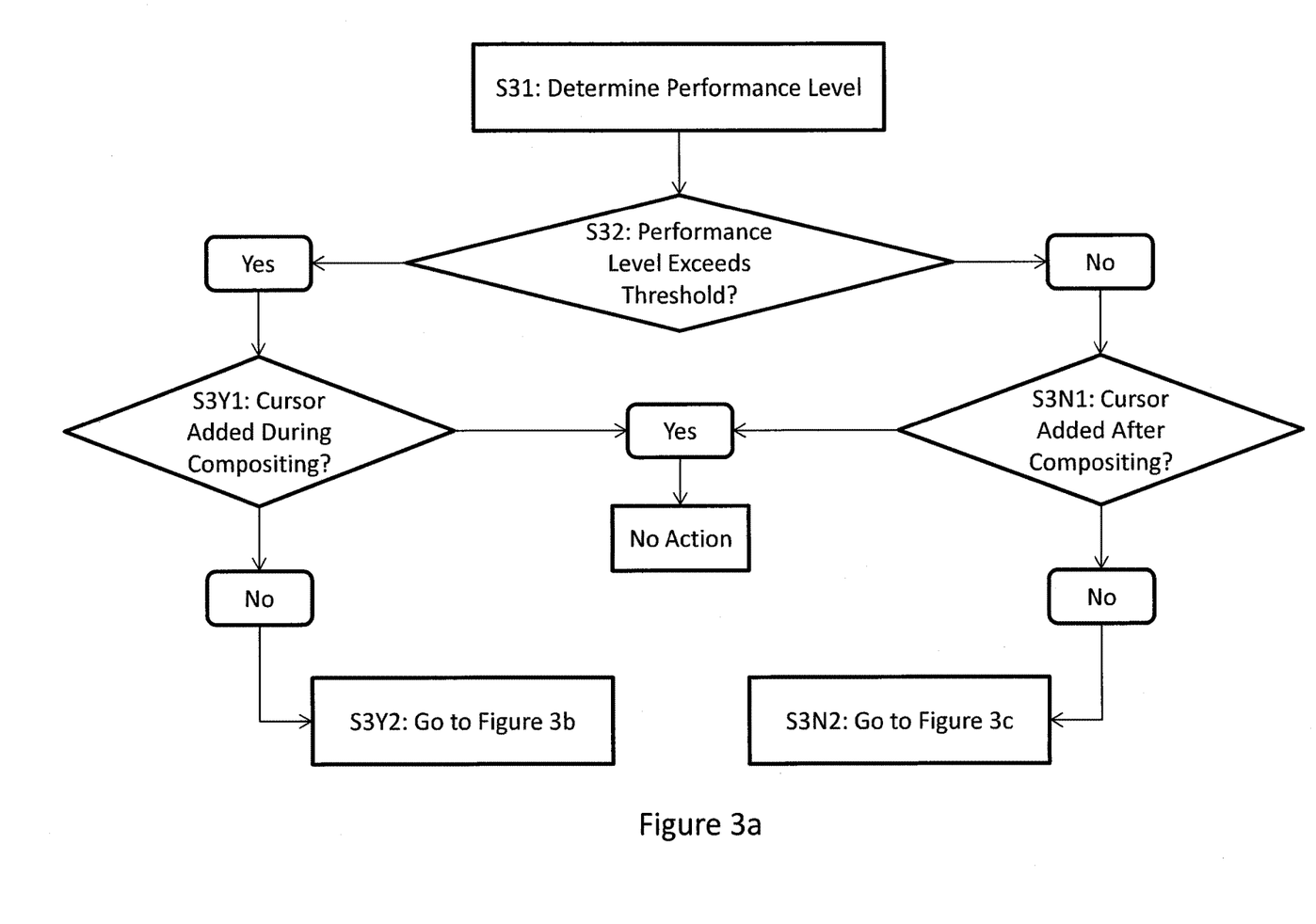
FIGS. 3a, 3b, and 3c show an example process.

FIG. 3a shows the first part of a process according to an embodiment of the invention.

At Step S31, the system—most likely the processor [15] on the host [11] but possibly another controller—measures the performance level of the system. This may be triggered by an external event, such as the connection of a new display device [13]. Alternatively, it may occur periodically, for example every five frames, or once per second. It may include consulting a record of recent latency, detecting interference on a wireless channel, determining the processing power of the processor which is available for composition as opposed to another function handled by the processor, or measuring bandwidth either within the host [11] or of the connection between the host [11] and the display controller [12]. For example, the indicator of performance may be the bandwidth of the connection between the memory used for the operating system frame buffer and the driver [16]. Alternatively, it may be a ratio between the resolution of the display device [13] and therefore the size of each frame in pixels and the bandwidth of the connection between the host [11] and the display controller [12].

At Step S32, the performance level is compared to a predetermined threshold value. This value indicates an acceptable lower limit of performance which triggers a change in where composition of the predetermined portion takes place. If the performance level is determined to exceed this threshold, i.e. the performance is better than the lower limit, the process follows the branch to the left, beginning at 'Yes'. Otherwise, the process follows the branch to the right, beginning at 'No'. The branch beginning at 'Yes' will be described first.

In this example, the performance is sufficient to allow all composition to take place on the host [11]. For example, the host [11] is producing relatively small frames, the bandwidth of all connections is sufficient for the volume of data, there is little latency between generation and display of a frame, and/or there is sufficient processing power available for the driver [16] or the processor [15] to perform all appropriate composition, compression, encryption, etc. At Step S3Y1, the processor [15] determines where composition with the predetermined portion is currently taking place. This may be done by checking a flag or registry value that indicates whether the processor [15] itself is currently compositing the cursor image with image frames in the process of compositing the frames according to the "software" method or whether the frames are being composited without the cursor image and this being added elsewhere according to the "hardware" method. Furthermore, this check may be performed by another control unit such as a main CPU of the host [11], but the effect is the same.

If all composition is taking place in the processor, the process moves to the next section beginning 'Yes': no change is necessary and no action is taken. The process will return to the beginning and wait for the next determination of the performance level, either at a time point or according to an external trigger, as previously described.

Figure 3B:
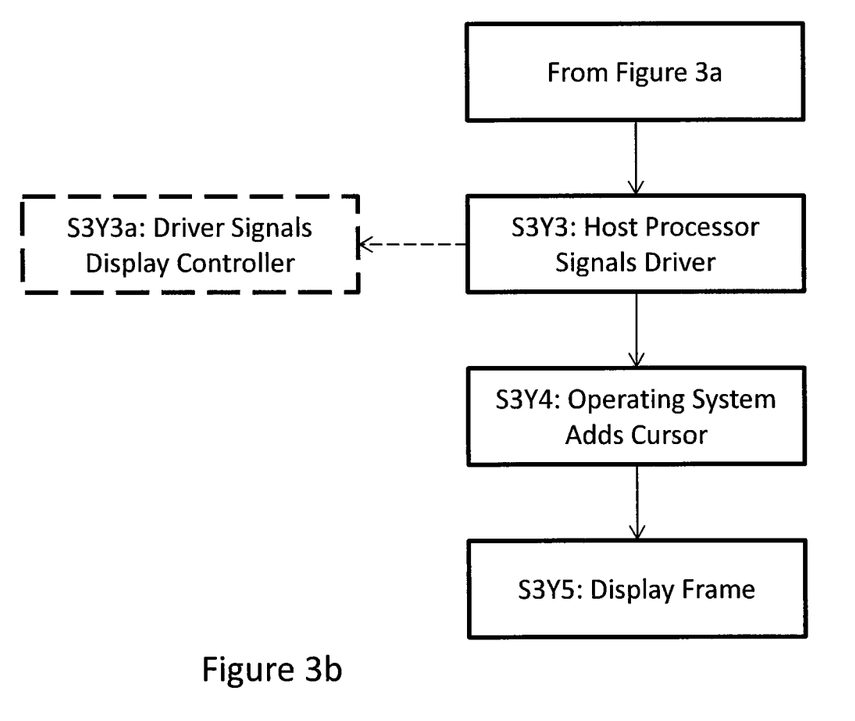

If not, the method in use must be changed and the process continues to Step S3Y2 and FIG. 3b.

FIG. 3b shows the steps for changing the method of compositing the full image frame from the "hardware" method—compositing the cursor with the image frame after the image frame is complete—to the "software" method—compositing the cursor data with the main image data into the image frame in the first instance. Since, as established at Step S3Y1, composition with the cursor image is taking place separately from composition of the rest of the frame, the driver [16] (in the emulated case) or the display controller [12] (in the proper hardware case) will be adding the cursor image to each frame prior to transmitting it to the display device [13] for display.

In the emulated case, which may be used where the display controller [12] does not have the memory allocation or processing capability to store the cursor image and perform additional blending as required for the operation of a hardware cursor unit [21], the driver [16] will fetch the cursor image from the secondary composition unit [18] and blend it into a frame—previously composited without a cursor by the processor [15]—at a location notified to it by the processor [15] (or, indeed, received directly from a mouse driver or similar). It can then send the completed frame or the part of the frame that includes the cursor, together with its location, to the display controller [12]. This means that it does not have to wait for the processor [15] to finish compositing and transmit a complete new frame including a cursor, which reduces delay. Naturally, if the secondary composition unit [18] is a processing engine in its own right, it may perform the actual blending locally with the same effect. An embodiment for this case is shown in FIG. 1.

In the proper hardware case, the cursor image is stored on the display controller [12] and blended by the hardware cursor unit [21] into an image frame which the host [11] had previously transmitted without a cursor. This means that the display controller [12] can continue to update the image shown on the display device [13] without having to wait to receive data from the driver [16]; the driver [16] merely has to transmit the location of the cursor image to the display controller [12]. An embodiment for this case is shown in FIG. 2.

From the point of view of the processor [15] and the operating system, both methods function in the same way. Hence, they are both treated in the same way.

From Step S3Y2 at the bottom of FIG. 3a, the process moves to Step S3Y3: the host processor [15] sends a signal to the driver [16] indicating that from now on the cursor image will be composited into image frames at the host [11], as they are produced. In the emulated case described above, the driver [16] will stop compositing a cursor image with frames prior to sending them for display. In the proper hardware case described above, the driver [16] will transmit a signal to the display controller [12] at Step S3Y3a, which is shown in a dashed box in FIG. 3b as it is optional; this step will only take place where the proper hardware case is in operation and causes the hardware cursor unit [21] on the display controller [12] to stop blending its stored cursor image into the frames.

In either case, the process will then move to Step S3Y4: the operating system, or other windowing system, composites the cursor image stored in the processor [15] into frames during their initial composition. This means that the cursor image can be correctly placed in relation to other display data, rather than placing the cursor in the correct location on potentially-out-of-date display data.

The frame is then sent for display at Step S3Y5. It is transmitted from the processor [15] to the driver [16], most likely by being copied from one frame buffer to the other, and then to the display controller [12], which renders it to the display device [13] in the conventional way. No further cursor images need be added at these stages.

Returning to FIG. 3a, in a second example in which the performance level does not exceed the pre-programmed threshold, for example there is not sufficient bandwidth to transmit a large frame to the display controller [12] for display, or the processing power in the host [11] is not sufficient to produce a large frame quickly enough to account for the update speed of the display device [13], the process follows the branch to the right beginning at 'No'.

At Step S3N1, the processor [15] or a connected controller determines where composition with the predetermined portion is currently taking place, most likely in the same way as previously described at Step S3Y1. If the cursor image is currently being composited into an otherwise finished frame in the driver [16] or display controller [12], no change is necessary and no action is taken until the performance level is determined again. Otherwise, the process moves to Step S3N2 and FIG. 3c.

Figure 3C:
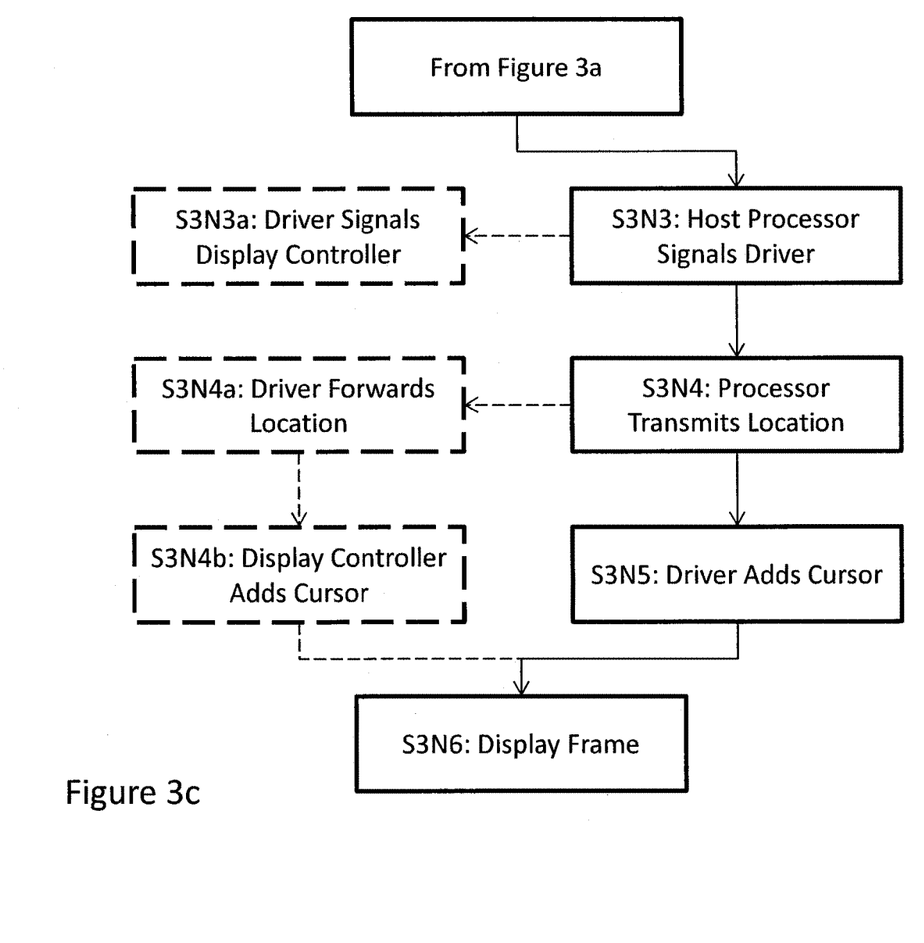

As previously described, in this case the cursor image is currently being composited into a frame in the process of frame generation in the processor [15] on the host [11]. FIG. 3c shows the process of switching to a method of compositing an otherwise complete image frame with a cursor image. Switching to the proper hardware case is an alternative branch which also requires additional steps, but since the beginning and ending points are the same, this branch is shown as an alternative in FIG. 3c, indicated by dashed boxes and arrows while the emulated case has solid boxes and arrows. The process will herein be iterated twice, first for the embodiment shown in FIG. 1 in which the cursor is composited with the received image frame in the driver [16] and second for the embodiment shown in FIG. 2 in which this takes place on the display controller [12].

From Step S3N2 at the bottom of FIG. 3a, the process moves to Step S3N3, in which the processor [15] or other controller as appropriate sends a signal to the driver [16] indicating that it should begin adding the cursor image itself at a location transmitted by the processor [15] or, as previously mentioned, received from a mouse driver or other user interface input. This location, together with any other appropriate information regarding the cursor, such as which of a selection of cursor images to use, the angle at which it should be drawn, etc. is transmitted and received at Step S3N4.

In the meantime, the operating system also composites the rest of the image data into a frame without the cursor image and transmits this incomplete frame to the driver [16]. This may be done asynchronously with other signalling such as the transmission of the location and may even take place over entirely different mechanisms, and therefore the driver is not reliant on this step and does not have to wait for the composition of the image frame to be complete.

At Step S3N5, the driver uses the secondary composition unit [18] to add a cursor image to the next frame to be transmitted to the display controller [12]. In this embodiment, the secondary composition unit [18] is a special buffer which can be accessed by the driver [16], and each time it transmits a frame for display the driver first fetches the cursor image from this buffer [18] and composites it with the frame. At Step S3N6 it then transmits the frame to the display controller [12] for display in the usual way. In this embodiment, the display controller [12] is not aware of where the cursor image is composited.

Alternatively, at Step S3N6 the driver [16] could transmit only the part of the fully-composited frame where the cursor image appears, together with its location. This is distinct from the proper hardware case as the display controller [12] still does not need to carry out any new composition; this has taken place in the driver [16]. The display controller [12] simply has to replace the image data in a stored frame with the received image data.

In the embodiment shown in FIG. 2, the process also begins at Step S3N3 with the processor [15] sending a signal to the driver [16] indicating that it will no longer composite the cursor image as part of the composition of the main image data. The driver [15] is likely to be the only route for communication with the display controller [12], though in a case where there are other routes for communication one of these could be used for the processor [15] to signal the display controller [12] directly and possibly for the transmission of location and other information. However, the provision of such connections would be likely to add additional overhead and therefore it is unlikely that they will be provided. Such an option is not further discussed herein, but it could ultimately operate in a similar way.

Having received the signal from the processor [15], the driver [16] forwards it to the display controller [12] at Step S3N3a. The firmware on the display controller [12] will now be aware that it will receive location and other data from the driver [16] and it will need to blend the cursor image itself.

The process then moves to Step S3N4 in the same way as in the emulated case. As previously mentioned, the operating system is unaware of where the cursor data will be composited, and it will transmit the location of the cursor to the driver [16] in either case. This will be done with every update of the cursor location, i.e. every time the user moves the mouse, separately to updates of the main image data in the rest of the frame.

In the embodiment in which the composition of the cursor takes place on the display controller [12], however, the process then moves to Step S3N4a as the driver [16] forwards the location received from the processor [15] to the display controller [12].

It does this every time it receives an updated location from the processor [15] regardless of the presence of any other data. This means that only the updated location data need be transmitted to the display controller [12], meaning that the time required for generation and transmission of a new frame, and the bandwidth available, does not need to delay the reaction of the cursor to a movement made by the user, so lag is less obvious.

At Step S3N4b, the hardware cursor unit [21] adds the cursor image to the next frame to be displayed by fetching the cursor image from a cursor buffer and blending it into a stored frame at the location supplied to the display controller [12] by the driver [16]. The display controller then renders the finished frame to the display device [13] in the conventional way at Step S3N6.

The method has been described with reference to pointers and cursor images controlled by a pointer controller such as a mouse [14], but similar methods could be used for any portion of the image which can move independently of the rest of a frame of display data and which has a quality of service requirement higher than the rest of the image due to time-criticality of updates, update frequency, dependability requirements, or priority. Such portions of the image would be delayed by any delay in the transmission of display data from the source of the image to the display device. The portions are usually already known in that they are identified as having a higher quality-of-service requirement before any data is composited, or even before data is generated; this identification may be pre-programmed at the manufacture of a device or piece of software. Examples include updates for a digital or analogue clock, a warning or alarm indication such as a symbol next to an icon for a device, a spinning hourglass indicating that the host [11] is performing an action requested by the user, or similar. These are independent of the rest of the frame, and they must be updated promptly and relatively frequently either in order to fulfil their function or to provide a good user experience, while the rest of the frame may not have such requirements. Examples are shown in FIG. 4.

In all these cases, a small amount of image data comprising a static icon can be blended into a pre-generated frame at a specific location and angle, and therefore compositing a pre-prepared portion of image data into an already-composited frame could be beneficial. By way of demonstration, this method is being used in each example.

Figure 4A:
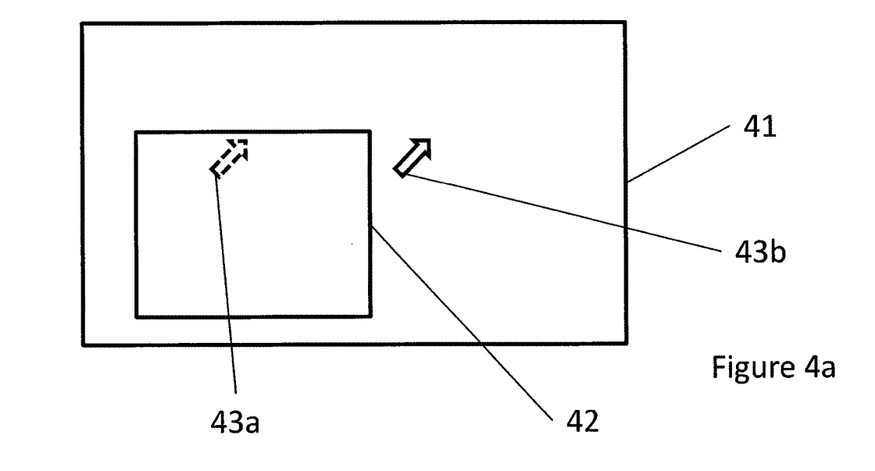
FIGS. 4a, 4b, and 4c show examples of other uses of the invention, together with the benefits of a cursor provided by the "software" method.
Figure 4B:
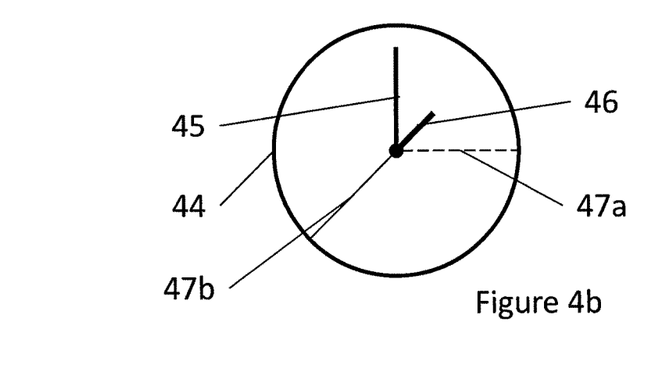
Figure 4C:
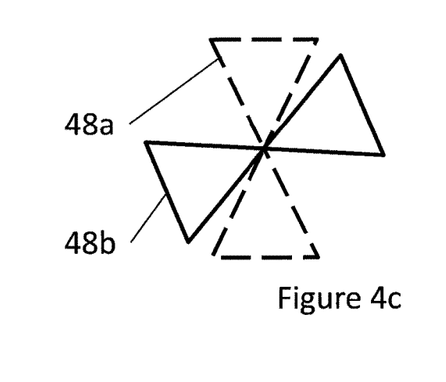

FIG. 4a shows a cursor [43] and a window [42] in a frame of display data [41]. In this example, the user is attempting to drag the window [42] across the screen in the conventional way, having started with the cursor at the position indicated by the dashed arrow [43a]. Because the cursor image has been superimposed onto the frame separately from the generation of new display data, the cursor appears to move independently of the window [42] and therefore is displayed at its new location, indicated by the solid arrow [43b], before the main display data is updated and the window [42] moves. This is an example of window lag.

Avoidance of window lag is a benefit of performing all composition at the same time on the host [11]. However, where it would not be possible to update the main display data in time due to performance limitations, it is better to allow window lag than for the user to move the mouse and the cursor not react. This is why dynamic switching between methods is beneficial.

A similar effect is shown in FIG. 4b, which shows the example of an analogue clock [44] which might be displayed in the corner of a frame, for example on a desktop or a public announcement screen. The clock [44] has a minute hand [45] and an hour hand [46] which are updated relatively infrequently, and it also has a second hand [47] whose position is, naturally, updated once per second. The above described methods could usefully be applied to the second hand [47] as it is annoying for a user if the second hand of a clock does not move regularly. In this case, the information transmitted to the driver [16] by the processor [15] and thence to the display controller [12], if appropriate, could in fact be an angle of the line representing the second hand [47], in the form, for example, of a pair of co-ordinates between which the line should be drawn, or simply an angle and a location of one part if the second hand is represented by a graphical icon such as a long arrow.

FIG. 4b also shows an example of doubling: since the driver [16] or hardware cursor unit [21] on the display device [12] might be superimposing the updated second hand [47b] onto a saved frame, there may be a second hand [47a] already shown on that frame, having been generated when the full frame was composited in the processor [15]. This means that there may be a frozen second hand [47a] located where the dashed line is shown in FIG. 4b while a moving second hand [47b] is visible in the correct location. This is a further benefit of the use of a software cursor where possible and therefore of dynamically switching the composition method in use.

FIG. 4c shows the final example of an hourglass [48] which turns over periodically in order to reassure the user that the host [11] is still operational and the displayed image has not 'frozen'. Since this is designed precisely to update frequently when there is little processing power available, composition of this icon into an existing image frame would be particularly useful in this case, and in fact the same flag used to indicate that a "busy" moving icon such as this should be used could also function as a trigger to the processor [15] to switch the location in which composition of this symbol takes place, in which case no doubling such as that shown in FIG. 4c need occur. However, where the switch takes place after the hourglass is first shown, there may be doubling as previously described and demonstrated by the dotted hourglass [48a] shown in FIG. 4c alongside the correctly-positioned updated solid hourglass [48b]. This also demonstrates the benefit of dynamic switching.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/ or in one or more software modules, or in any appropriate combination of hardware devices and software modules.

Furthermore, software instructions to implement the described methods may be provided on a computer readable medium.

The invention claimed is:

1. A method for displaying an image on a display device, the display device being part of a display system also comprising a host device configured to at least composite image data into an image frame and to transmit the image frame, and a display controller configured to receive the image frame over a data communication channel from the host device, wherein the image displayed on the display device comprises a predetermined portion having a Quality of Service (QoS) requirement higher than remaining portions of the image, the method comprising:
measuring a performance level of the display system;
determining whether the performance level is above a predetermined threshold;
if it is determined that the performance level is above the predetermined threshold, then:
compositing the predetermined portion with the image data into the image frame at the host device; and
transmitting the image frame including the predetermined portion from the host device to the display controller over the data communication channel that causes the image frame to be displayed on the display device as the image;
if it is not determined that the performance level is above the predetermined threshold, then:
compositing the image data without the predetermined portion into the image frame at the host device;
transmitting the image frame without the predetermined portion from the host device to the display controller over the data communication channel;
transmitting information regarding the predetermined portion from the host device to the display controller over the data communication channel independently of the image frame; and
compositing the received image frame with the predetermined portion at the display controller based on the information to produce the image for display on the display device.

2. The method for displaying an image according to claim 1, wherein the information is transmitted at least as often as the image frame is transmitted.

3. The method for displaying an image according to claim 1, wherein the information comprises image data for the predetermined portion and location information indicating where the image data for the predetermined portion is to be composited with the image frame.

4. The method for displaying an image according to claim 1, wherein image data for the predetermined portion is generated at the display controller and the information comprises location information indicating where the image data for the predetermined portion is to be composited with the image frame.

5. The method for displaying an image according to claim 1, wherein the information regarding the predetermined portion is transmitted with a higher priority or QoS than the image data.

6. The method for displaying an image according to claim 1, wherein the predetermined portion is determined by heuristically determining the portion of the image that has the higher QoS requirement than the remaining portions of the image.

7. The method for displaying an image according to claim 6, wherein the predetermined portion is further determined by determining which portion of the image a user is looking at.

8. The method for displaying an image according to claim 1, wherein the performance level is determined periodically or in response to a stimulus comprising at least one of a connection of a new display device or an alteration in applications running on the host device.

9. The method for displaying an image according to claim 1, wherein the performance level comprises one or more of:
a processing power available at the host device;
a bandwidth available on the data communication channel; or
a lack of latency in the display system.

10. The method for displaying an image according to claim 9, wherein the lack of latency is between a time when the image data is generated or received by the host device and a time when the image is displayed by the display device.

11. The method for displaying an image according to claim 1, wherein the quality of service requirement comprises one or more of:
a time-criticality of information in the predetermined portion;
an update frequency of the predetermined portion;
a dependability of display of information in the predetermined portion on the display device; or
a priority of information in the predetermined portion.

12. The method for displaying an image according to claim 1, wherein the predetermined portion comprises one or more of:
a cursor;
a moving icon that indicates that the system is executing;
a clock; or
a warning or alarm indication.

13. The method for displaying an image according to claim 1, wherein, if it is determined that the performance level is above the predetermined threshold and subsequently it is determined that the performance level is not above the predetermined threshold, then the host device:
stops compositing the predetermined portion with the image data;
transmits the image frame without the predetermined portion from the host device to the display controller over the data communication channel; and
transmits the information regarding the predetermined portion from the host device to the display controller over the data communication channel independently of the image frame.

14. The method for displaying an image according to claim 1, wherein, if it is determined that the performance level is not above the predetermined threshold and subsequently it is determined that the performance level is above the predetermined threshold, then the host device:
stops transmitting the image frame without the predetermined portion from the host device to the display controller over the data communication channel;
stops transmitting the information regarding the predetermined portion from the host device to the display controller over the data communication channel independently of the image frame;
composites the predetermined portion with the image data into the image frame at the host device; and
transmits the image frame including the predetermined portion from the host device to the display controller over the data communication channel that causes the image frame to be displayed on the display device as the image.

15. A display system for displaying an image on a display device, the display system also comprising a host device configured to at least composite image data into an image frame and to transmit the image frame, and a display controller configured to receive the image frame over a data communication channel from the host device, wherein the image displayed on the display device comprises a predetermined portion having a Quality of Service (QoS) requirement higher than the rest remaining portions of the image, wherein the system is configured to:

measure a performance level of the display system;
determine whether the performance level is above a predetermined threshold;
if it is determined that the performance level is above the predetermined threshold, then:
  composite the predetermined portion with the image data into the image frame at the host device; and
  transmit the image frame including the predetermined portion from the host device to the display controller over the data communication channel that causes the image frame to be displayed on the display device as the image;
if it is not determined that the performance level is above the predetermined threshold, then:
  composite the image data without the predetermined portion into the image frame at the host device;
  transmit the image frame without the predetermined portion from the host device to the display controller over the data communication channel;
  transmit information regarding the predetermined portion from the host device to the display controller over the data communication channel independently of the image frame; and
  composite the received image frame with the predetermined portion at the display controller based on the information to produce the image for display on the display device.

16. The display system of claim 15, wherein, if it is determined that the performance level is above the predetermined threshold and subsequently it is determined that the performance level is not above the predetermined threshold, then the host device:
stops compositing the predetermined portion with the image data;
transmits the image frame without the predetermined portion from the host device to the display controller over the data communication channel; and
transmits the information regarding the predetermined portion from the host device to the display controller over the data communication channel independently of the image frame.

17. The display system of claim 15, wherein, if it is determined that the performance level is not above the predetermined threshold and subsequently it is determined that the performance level is above the predetermined threshold, then the host device:
stops transmitting the image frame without the predetermined portion from the host device to the display controller over the data communication channel;
stops transmitting the information regarding the predetermined portion from the host device to the display controller over the data communication channel independently of the image frame;

composites the predetermined portion with the image data into the image frame at the host device; and
transmits the image frame including the predetermined portion from the host device to the display controller over the data communication channel that causes the image frame to be displayed on the display device as the image.

18. A non-transitory computer readable medium including executable instructions which, when executed in a display system for displaying an image on a display device, the display system also comprising a host device configured to at least composite image data into an image frame and to transmit the image frame, and a display controller configured to receive the image frame over a data communication channel from the host device, wherein the image displayed on the display device comprises a predetermined portion having a Quality of Service (QoS) requirement higher than remaining portions of the image, cause the display system to:

measure a performance level of the display system;
determine whether the performance level is above a predetermined threshold;
if it is determined that the performance level is above the predetermined threshold, then:
  composite the predetermined portion with the image data into the image frame at the host device; and
  transmit the image frame including the predetermined portion from the host device to the display controller over the data communication channel that causes the image frame to be displayed on the display device as the image;
if it is not determined that the performance level is above the predetermined threshold, then:
  composite the image data without the predetermined portion into the image frame at the host device;
  transmit the image frame without the predetermined portion from the host device to the display controller over the data communication channel;
  transmit information regarding the predetermined portion from the host device to the display controller over the data communication channel independently of the image frame; and
  composite the received image frame with the predetermined portion at the display controller based on the information to produce the image for display on the display device.

19. The non-transitory computer readable medium of claim 18, wherein, if it is determined that the performance level is above the predetermined threshold and subsequently it is determined that the performance level is not above the predetermined threshold, then the executable instructions cause the host device to:
stop compositing the predetermined portion with the image data;
transmit the image frame without the predetermined portion from the host device to the display controller over the data communication channel; and
transmit the information regarding the predetermined portion from the host device to the display controller over the data communication channel independently of the image frame.

20. The non-transitory computer readable medium of claim 18, wherein, if it is determined that the performance level is not above the predetermined threshold and subsequently it is determined that the performance level is above the predetermined threshold, then the executable instructions cause the host device to:

stop transmitting the image frame without the predetermined portion from the host device to the display controller over the data communication channel;

stop transmitting the information regarding the predetermined portion from the host device to the display controller over the data communication channel independently of the image frame;

composite the predetermined portion with the image data into the image frame at the host device; and transmit the image frame including the predetermined portion from the host device to the display controller over the data communication channel that causes the image frame to be displayed on the display device as the image.

* * * * *